United States Patent
Erden

(10) Patent No.: US 6,364,521 B1
(45) Date of Patent: Apr. 2, 2002

(54) REACTOR FOR MANUFACTURING POPPING CANDY

(75) Inventor: Ibrahim S. Erden, Istanbul (TR)

(73) Assignee: Hleks Gida Sanayi ve Ticaret Anonim Sirketi, Istanbul (TR)

(*) Notice: Subject to any disclaimer, the term of this patent is extended or adjusted under 35 U.S.C. 154(b) by 0 days.

(21) Appl. No.: 09/601,514
(22) PCT Filed: Nov. 5, 1998
(86) PCT No.: PCT/TR98/00022
  § 371 Date: Sep. 27, 2000
  § 102(e) Date: Sep. 27, 2000
(87) PCT Pub. No.: WO99/38385
  PCT Pub. Date: Aug. 5, 1999

(30) Foreign Application Priority Data

Feb. 2, 1998 (TR) .................................. 98/160

(51) Int. Cl.⁷ ................................................ B01F 15/06
(52) U.S. Cl. ...................... 366/147; 99/517; 165/109.1; 62/342
(58) Field of Search ................................ 366/312, 144, 366/147, 149, 325.4; 99/517; 165/109.1; 62/342, 343

(56) References Cited

U.S. PATENT DOCUMENTS

| | | | | |
|---|---|---|---|---|
| 1,949,374 A | * | 2/1934 | Johnson | 366/147 |
| 1,953,295 A | * | 4/1934 | Garbutt | 366/147 |
| 1,978,176 A | * | 10/1934 | Steenstrup | 366/149 |
| 2,132,364 A | * | 10/1938 | Thompson | 366/149 |
| 2,283,487 A | * | 5/1942 | Boileau | 366/312 |
| 2,302,169 A | * | 11/1942 | Baker | 366/147 |
| 2,367,279 A | * | 1/1945 | Houlton | 366/147 |
| 2,735,276 A | * | 2/1956 | Thompson, Jr. | 366/149 |
| 3,161,404 A | * | 12/1964 | Jay | 366/312 |
| 3,250,321 A | * | 5/1966 | Root, III | 366/149 |
| 3,780,536 A | * | 12/1973 | Fishman et al. | 366/149 |
| 3,914,956 A | * | 10/1975 | Knight, Jr. | 366/312 |
| 3,921,961 A | * | 11/1975 | Hapgood | 366/149 |
| 4,040,768 A | * | 8/1977 | Christian | 366/147 |
| 4,183,674 A | * | 1/1980 | Sudo et al. | 366/149 |
| 4,432,650 A | * | 2/1984 | Langen et al. | 366/147 |
| 4,527,902 A | * | 7/1985 | Christen | 366/147 |
| 5,911,811 A | * | 6/1999 | Muntener | 366/147 |

FOREIGN PATENT DOCUMENTS

| | | |
|---|---|---|
| EP | 0 533 609 A1 | 3/1993 |
| GB | 1 521 179 | 8/1978 |
| GB | 2 200 830 | 8/1988 |

* cited by examiner

Primary Examiner—Tony G. Soohoo
(74) Attorney, Agent, or Firm—Nixon & Vanderhye P.C.

(57) ABSTRACT

This invention is related to a reactor used in the production of hard candy by employing a treatment with neutral carbon dioxide gas and thus having gas bubbles, which effervesce in the mouth. The reactor for manufacturing popping candy includes a pressure vessel of double-walled construction; a shaft assembly mounted within the pressure vessel for rotation about a longitudinal axis of the pressure vessel; the shaft assembly including a first shaft located within a second shaft for circulation of cooling fluid in the shaft assembly; a plurality of stirring blades secured to the second shaft and arranged at an angle to the longitudinal axis; and a reactor wall stripper attached to outer ends of the blades, the reactor wall stripper having a width substantially identical to widths of the blades.

9 Claims, 3 Drawing Sheets

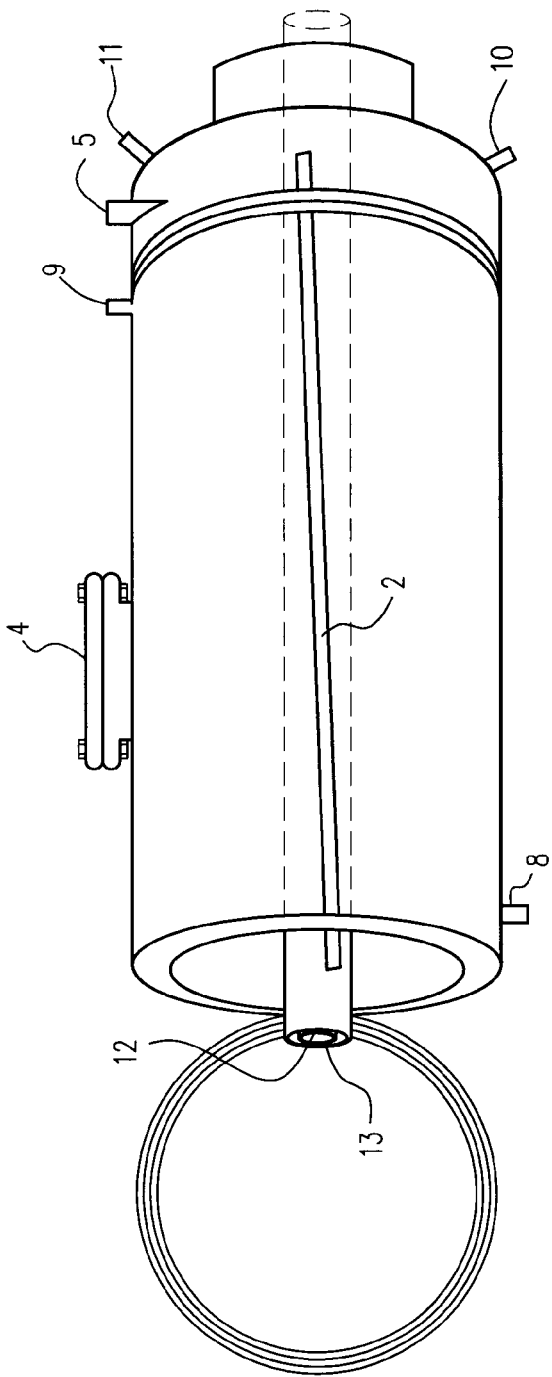
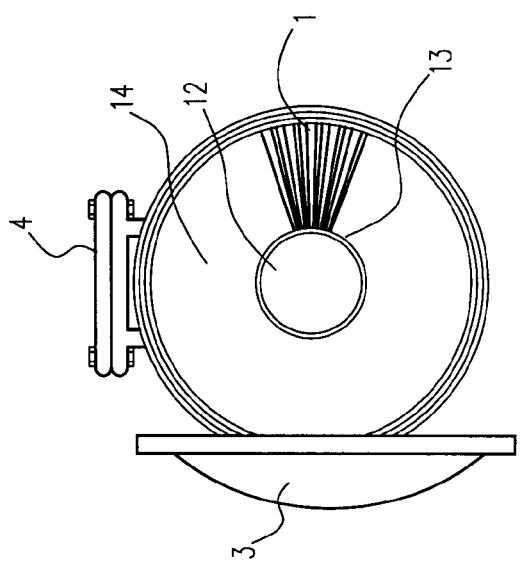
FIGURE 4
FIGURE 2

REACTOR FOR MANUFACTURING POPPING CANDY

This invention is related to a new production method and related apparatus that treats the material with neutral carbon dioxide gas and forms a hard candy that contains gas bubbles in it, creating a small popping effect in the mouth.

PRIOR ART

Technically, popping candy production is attained by various methods, some of which are summarized below.

In British Patent 1 540 515, a system containing two pressurized tanks that are connected to each other is used. In this method, gas is applied to the hot sugar concentrate from the first pressured tank that is under super atmospheric pressures and later this mixture is transferred to the second tank through a pipe and valve system. While it is being transferred from the second tank to the first tank, the mixture is cooled in this tank under pressure and by decreasing the pressure, it is then possible to crumble the solid mixture. The disadvantage of this method is that because of using two pressurized reactors, the cost of the system is increased and the processing time is prolonged.

In British Patents 1 521 150 and 1 521, 178, similar methods are used.

During the application of the method described in British patent application No. 2 200 830, a new gas adding method is mentioned for the production of popping candy. In this method, gas is supplied to the hot candy concentrate in a pressurized tank, at a place close to the bottom of the tank in the form of a gas curtain.

In British Patent application No. 2 048 643 wherein a reactor having the capacity of 500 litre carbon dioxide gas is used to provide the distribution of the gas bubbles within the sugar concentrate homogenously, gas is fed from the bottom part of the reactor and the distribution of the gas bubbles is provided by means of a vertical mixing system.

However, using a reactor having a volume of 500 liters in this known method to produce already expensive popping candy results in a more expensive manufacturing process. Furthermore, another disadvantage of this method is that too much time is spent during the cooling of the hot sugar mass of 500 liters. In addition, unloading the cooled sugar mass causes loss of time and labor.

Another disadvantage is that in case of a breakdown or a mistake during the course of the process, a great loss can be expected.

SUMMARY OF THE INVENTION

This invention is related to the production of candy by mixing the hot candy mass with neutral carbon d oxide gas homogenously under high pressure and solidifying the mass with bubbles wherein the gas bubbles entrapped in the candy during the manufacturing causes small popping in the mouth.

Instead of using expensive and complex units, in the method of this invention a reactor in which candy mass is mixed with gas homogeneously and cooled can be conducted as well before being charged out.

The invention will be described herebelow with reference to the enclosed drawings.

BRIEF DESCRIPTION OF THE DRAWINGS

FIG. 2 is a side cross section view of the reactor with the internal shafts;

FIG. 4 is a view taken from top of the reactor with the internal shafts; and

DETAILED DESCRIPTION OF THE DRAWINGS

Figure 1:
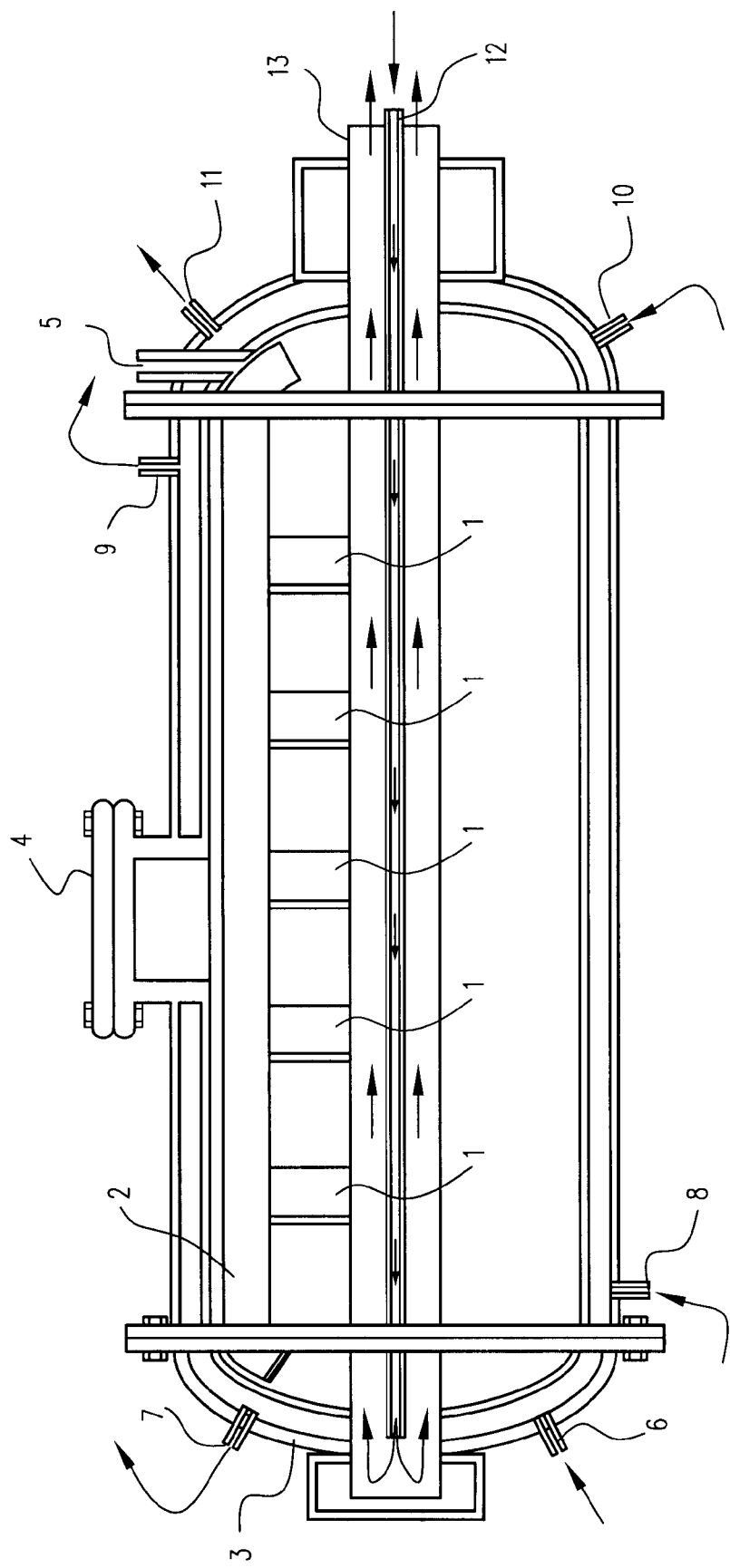
FIG. 1 is a cross-section of the reactor used in the present method.
Figure 5:
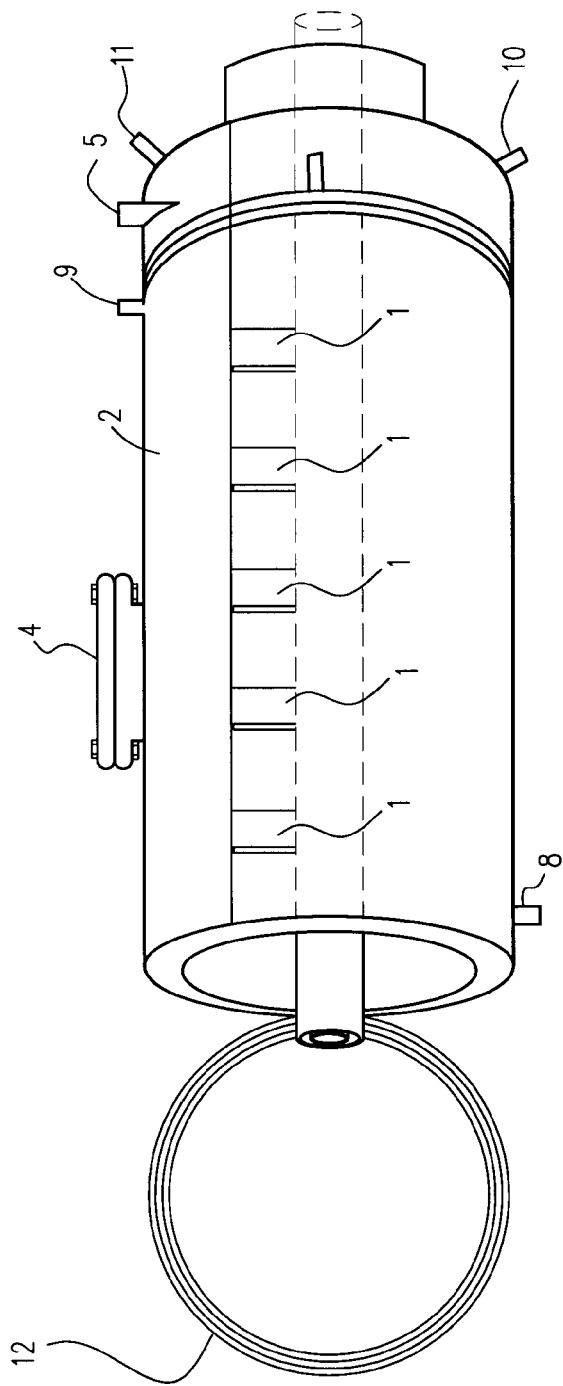
FIG. 5 is a front view of the reactor with the internal shafts.

According to this invention, a sugar syrup composed of sugar, glucose, lactose and water are boiled in the cooking unit until the temperature of the mass reaches up to 155° C. and thus the amount of water in the sugar mass decreases to 1–1.5%. High moisture level results in soft sticky matrix and it causes the release of the gas in the bubbles without being entrapped within the candy.

This boiled highly concentrated syrup is poured from the charge inlet (4) into a pressure reactor wherein the outer surface is of double walled construction. Right after pouring the mass, carbon dioxide gas with high atmospheric pressure is supplied and the mixing operation is started. Mixing is provided by a stirring mechanism that includes stirring blades (1) in the form of flat plates located intermittently and at an angle with respect to a horizontally arranged shaft assembly mounted for rotation within the reactor and about a longitudinal axis of the reactor. The shaft assembly includes shafts (12, 13) that extend along the longitudinal axis of the reactor, with shaft (12) located concentrically within shaft (13). Mixing is also facilitated by means of reactor wall stripper (2) in the form of a flat plate having the same thickness and width of the blades and connecting the blades. The ends of the stripper or flat plate (2) are shaped to conform or extend parallel to the curved internal side surface of the reactor, located parallel and a few millimetres away from the internal side of the reactor.

Figure 3:
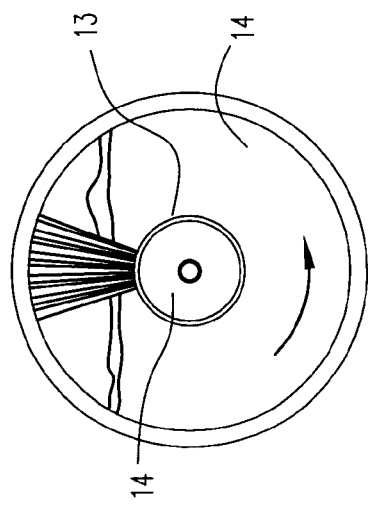
FIG. 3 is a side cross section of the reactor.

Mixing is conducted by rotating the stirring mechanism at 120 rpm within a prescribed time along with the candy mass and neutral gas within the reactor. Although the stirring speed is proportional to the volume and amount of the mass, higher stirring speed will destroy the chemical structure of the candy and the resultant product cannot be used. With higher stirring rates, it will not be possible to have a candy with desired properties and this will lead to the increase of the friction that leads to the increase of the heat. In the end, the candy will start crystallise quite early. Lower stirring speed will also cause the crystallisation. Stirring is provided by rotating the reactor that is placed horizontally to the direction of the fingers of a hand when the thumb is placed to the centre of the outer side of the reactor. Stirring direction will be the direction of the blade (1) plates that are located in an angle. (FIG. 3)

As the blades (1) rotate, the soft candy having high viscosity and neutral gas mixed with it create a turbulence. This increases the movement of the candy and gas within the reactor and also provides for the continuous replacement of candy on the "screw threads" formed by the location, angles and rotation of the blades. As a results a homogenous mixture is provided. The movement of the blades (1) also causes the fracturing of the gas bubbles entrapped in the candy because the rotating blades causes the entrapping of the gas into the candy and fractures of the bubbles. In the results bubbles having various sizes and amounts are attained.

The reactor used in the present method, wherein the candy is mixed with carbon dioxide gas under high pressure and then cooled, is made of stainless steel having a volume of 70 litres with double walls.

The reactor is resistant to high atmospheric pressures, having a stirring mechanism consisting of a reactor wall stripper (2) attached to the blades, located at an angle to the horizontal shaft assembly including the double shafts (12, 13) which are placed horizontally along the axis of rotation of the reactor. The reactor is assembled on a mobile platform the height of which can be adjusted. As the platform is mobile, the reactor can be transported to any place needed during manufacturing.

The hot candy mass is poured into the reactor from its outlet (4) and following the addition of the flavouring, the outlet is closed. The carbon dioxide gas having 45 atmospheric pressure is injected into the space at the upper part of the reactor from gas inlet (5). At this phase, the mixture is stirred by means of the stirring mechanism rotating at 120 rpm.

The mixing blades (1) in the mixer are placed in a single row along the shaft (13) at a 30° angle to the axis of the shaft assembly. Hot sugar mass can move from one end to the other horizontally and at each cycle of the blades (1), the carbon dioxide gas mixing with the hot sugar mass is distributed to the entire reactor equally and thus a homogeneous gas distribution is attained. Mixing time and the position of the blades (1) on the mixing rod must be carefully observed to size the carbon dioxide bubbles in the hot sugar mass. The blades must be capable of having the carbon dioxide bubbles that are mixed into the hot sugar mass at each rotation, to reach the desired size. In case the aim is to have a popping candy in effervescent type, by increasing the mixing time the carbon dioxide bubbles can be reduced to a rather small size. In case it is aimed to have a more stronger small popping effect, the mixing time is reduced and thus larger bubbles can be formed in the hot candy mass. The mixing process takes 3 to 8 minutes according to the product preferred.

After the stirring process is completed, the inside pressure of the reactor is decreased to 30 atmosphere from 45 atmosphere in order to achieve bubbles of the desired diameter. Also large bubbles entrapped in the mass start to move towards the upper surface of the hot candy mass. Other bubbles of desired size stay suspended in the hot sugar mass which acquired the required degree of consistency.

The reactor is connected to the cooling fluid unit and the fast cooling process by means of the cold water circulating in the double wall of the reactor (cooling from outside to inside) and by means of cold water circulating in the shaft assembly (cooling from the centre towards each side).

Hot candy syrup at high concentration is cooled with water at 15° C. charged from cooling fluid inlet valves (6, 8, 10) in the outer wall of the double-walled reactor and circulating in the double walls, exiting via outlet valves (7, 9, 11) also in the outer wall of the reactor, as well as with the water in the two shafts (12, 13). The cooling thus moves from the centre of the reactor towards the sides and is continued until the temperature of the candy mass mixed with carbon dioxide gas reaches to 15° C.

The double walls of the reactor establish cooling of the hot candy mass from the centre towards sides but the thickness of the hot candy mass prevents an efficient and fast cooling. Therefore, the addition of cooling fluid circulating within the shafts (12, 13) provides additional heat exchange in the reactor to thereby shorten the cooling period and increase manufacturing capacity.

At the end of the cooling period, carbon dioxide gas with high atmospheric pressure in the reactor is released suddenly by opening the gas discharge valve. As a result of this sudden pressure change, the sugar mass is broken into pieces and crumbled. The product is discharged out of the reactor by opening the front lid (3). The pieces vary in size. The sugar pieces that are smaller than the desired size is sieved and the large ones are taken to the breaking unit for crumbling. According to this method, carbon dioxide gas is homogeneously distributed into the reactor and therefore the product sizes are very close to each other and the rate of loss is rather low. Following sieving, the percentage of usable sugar pieces changes between 74% and 82%. Thus, the rate of waste is 18% 23% and the sizes of the sugar crumbles which are considered as waste is 0.01 mm or lower and because of having rather low popping effect, these can not be included into end product.

According to this method, in case the stirring time exceeds 3 to 8 minutes, the increase of powder and pieces having unacceptable size in the end product, can not be prevented.

What is claimed is:

1. A reactor for manufacturing popping candy comprising a pressure vessel of double-walled construction; a shaft assembly mounted within said pressure vessel for rotation about a longitudinal axis of said pressure vessel; said shaft assembly including a first shaft located within a second shaft for circulation of cooling fluid in said shaft assembly; a plurality of stirring blades secured to said second shaft and arranged at an angle to said longitudinal axis; and a reactor wall stripper attached to outer ends of said blades, said reactor wall stripper having a width substantially identical to widths of said blades.

2. A reactor as claimed in claim 1 wherein said blades are of the shape of flat plates.

3. A reactor as claimed in claim 1 wherein said blades are concave.

4. A reactor as claimed in claim 1 wherein said blades are placed onto said second shaft with a 30° angle to said longitudinal axis.

5. A reactor as claimed in claim 1 including a mobile platform and wherein the reactor is placed horizontally on said mobile platform.

6. A reactor as claimed in claim 1 wherein the stirring blades are provided in a single row along said second shaft.

7. A reactor as claimed in claim 1 wherein said first shaft includes a cooling fluid inlet and said second shaft includes a cooling fluid outlet such that, in use, cooling fluid is circulated within a radial space between said first and second shafts.

8. A reactor as claimed in claim 1 wherein said pressure vessel includes inlet and outlet valves in an outer wall of said double walled construction for circulating cooling fluid in a space between said outer wall and an inner wall of said double-walled construction.

9. A reactor as claimed in claim 1 wherein said reactor comprises inner and outer walls and wherein at least said inner wall is curved at opposite ends of said reactor, and wherein said reactor wall stripper has opposite end portions that are shaped to substantially conform to said inner wall at said opposite ends.

* * * * *